July 1, 1924.
K. BAUMANN
1,499,332
FLUID PRESSURE SUPPORT FOR BEARINGS
Filed May 23, 1919  2 Sheets-Sheet 1
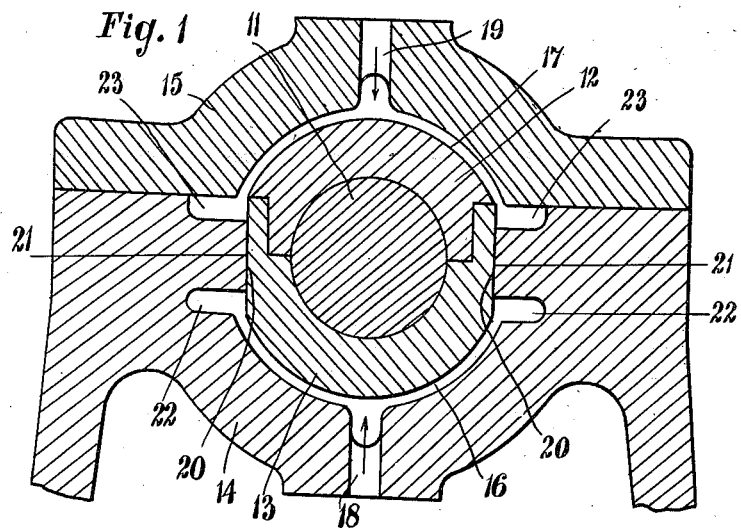
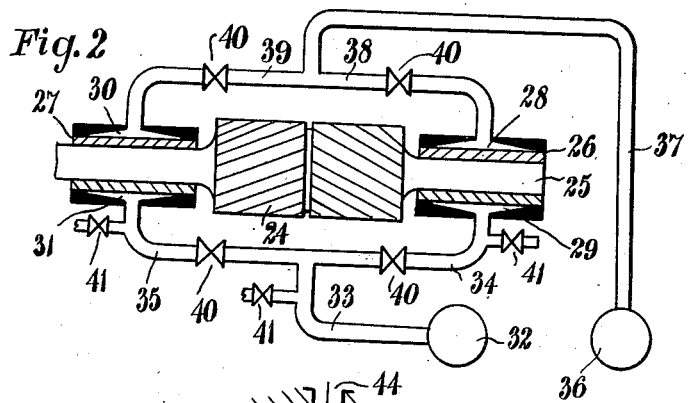
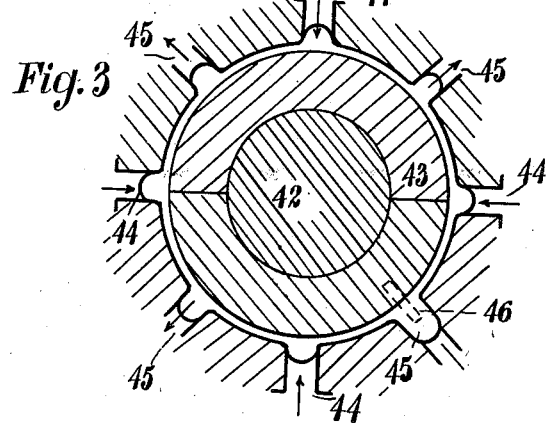
INVENTOR
Karl Baumann
By Jno. S. Green
atty.

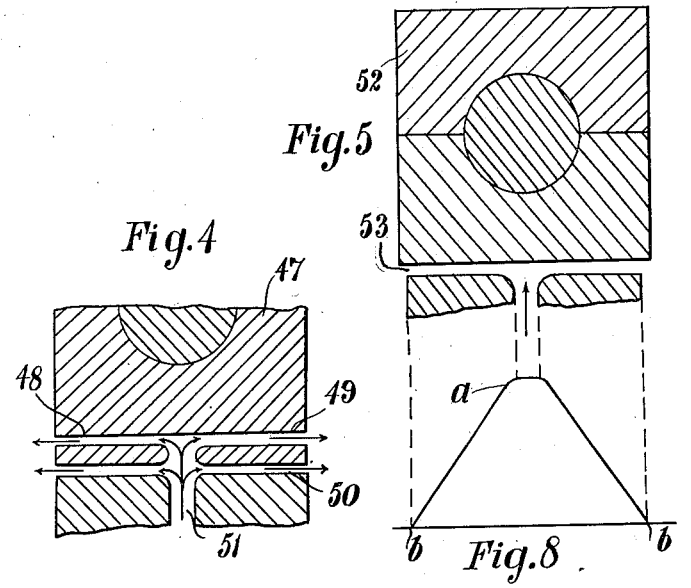
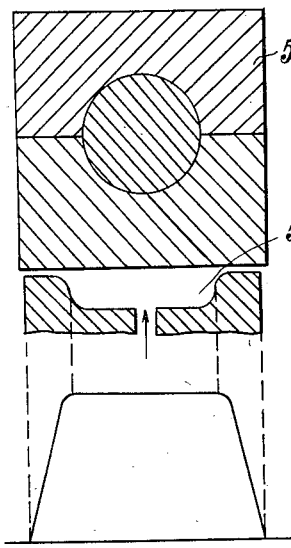
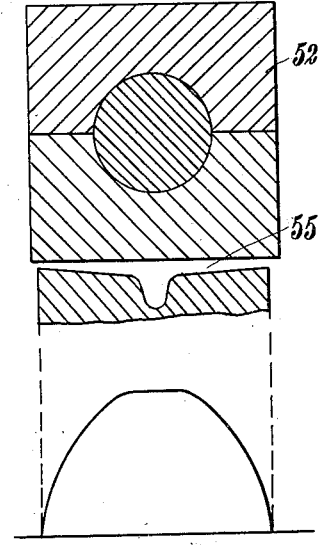

Patented July 1, 1924.

1,499,332

UNITED STATES PATENT OFFICE.

KARL BAUMANN, OF URMSTON, ENGLAND, ASSIGNOR, BY MESNE ASSIGNMENTS, TO WESTINGHOUSE ELECTRIC AND MANUFACTURING COMPANY, A CORPORATION OF PENNSYLVANIA.

FLUID-PRESSURE SUPPORT FOR BEARINGS.

Application filed May 23, 1919. Serial No. 299,217.

*To all whom it may concern:*

Be it known that I, KARL BAUMANN, a citizen of the Confederation of Switzerland, and a resident of Urmston, in the county of Lancaster, England, have invented a new and useful Improvement in Fluid-Pressure Supports for Bearings, of which the following is a specification.

This invention relates to bearings for shafts and the like and though not limited in this respect is particularly applicable to the bearings of toothed gearing.

It is desirable that the bearings of toothed gears constructed to transmit large amounts of power should be so supported that, while running, accurate alignment of the intermeshing teeth is secured, the pressure is distributed uniformly over the whole width of the teeth and vibration of the gear reduced to a minimum.

For the purpose of securing accurate alignment of the teeth while running, gears have been constructed in which a frame containing the pinion bearings is supported by interconnected oil pistons of such a size that the pressure on the whole width of the pinion is uniformly distributed, the position of the pinion in the centre being governed by a relief valve.

It has also been proposed to support the bearings on springs the deflection of which permits of the pressure being uniformly distributed over the whole width of the teeth.

For the purpose of minimizing vibration in high speed rotors, bearings have been suggested consisting of thin concentric sleeves with small clearances between them filled with oil. It has, however, been found that the oil in the clearances being stationary is liable to solidify and consequently reduce the damping action of the sleeves.

The present invention has for its object to provide improved bearing supporting means of simple construction possessing all of the aforementioned desiderata and additional advantages not found in bearing supports as hitherto constructed.

According to the invention the bearings are supported in position by films of suitable viscous liquid (hereinafter referred to as "oil") which are maintained by forcing oil through one or more relatively small clearance spaces provided between the bearing and its support. In this way any vibration which may be set up whilst the shaft or the like is running is partially or wholly absorbed by the film or films of oil which provide a cushioning effect. Also the position of one bearing with respect to another may be adjusted by forcing a greater quantity of oil through the clearance space or spaces between one bearing and its support than through the clearance space or spaces of the other bearing, and this adjustment may be made while the apparatus is in motion enabling the best running position to be secured in a minimum of time.

When applied to gearing accurate alignment of the co-operating teeth may be secured automatically by supplying the oil films to the different bearings of the gear from a single source.

In order that the invention may be clearly understood it will now be described in connection with the accompanying drawings in which Figure 1 is a transverse section of one form of bearing constructed in accordance with the invention. Figure 2 is a diagrammatic longitudinal section showing a pinion supported in two bearings arranged in accordance with the invention. Figure 3 is a diagrammatic cross-sectional view illustrating another form of bearing according to the invention. Figure 4 is a portion of a transverse section of the clearance space below a bearing hereinafter explained. Figures 5, 6 and 7 are transverse sections of bearings which are supported by fluid in reservoirs of various shapes of the clearance spaces, and Figures 8, 9 and 10 are pressure diagrams hereinafter explained.

Referring to Figure 1, a shaft journal 11 is supported between upper and lower bearings 12, 13, the lower bearing being contained in a pedestal or housing 14 and the upper covered by a cap 15. Between the lower bearing and its housing and between the upper bearing and the cap, clearance spaces 16, 17 are provided and passages 18, 19 lead respectively into these two clearance spaces through which oil under pressure is forced, the bearing being maintained in position by the oil films thus formed in the clearance spaces. As shown, the bearing is provided with vertical guide surfaces 20 which co-operate with guide surfaces 21 in the pedestal or housing, and drains 22, 23 are provided on each side of the bearing for leading away the oil from the lower and upper clearance spaces 16 and 17 respectively. With this construction the bearing may be raised by increasing the quantity of oil supplied to the lower clearance space 16 as compared with that supplied to the upper clearance space 17.

Figure 2 shows a pinion 24, the shaft 25 of which is supported in two bearings 26, 27, one on each side of the pinion, and each bearing may be of the form illustrated in Figure 1 for example with clearance spaces 28, 29, 30, 31 at the top and bottom as shown. Oil is supplied to the lower clearance spaces 29, 31 by an oil pump 32, through a pipe 33 with branches 34, 35 and to the upper clearance spaces 28 and 30 from a pump 36, through pipe 37 and branches 38, 39. Suitable throttle valves 40 are provided in each branch pipe so that the amount of oil supplied to the several clearance spaces and consequently the position of either bearing may be independently adjusted as required. In addition to, or in substitution for, the throttle valve 40, by-pass or relief valves may be provided as indicated at 41 for adjusting the quantity of oil supplied to both the lower clearance spaces at the same time or to either of them independently, as will be readily understood without further description. Similar by-pass or relief valves may be provided in the main and branch pipes leading to the upper clearance spaces 28, 30. The amount of oil supplied to the bearings may also be varied by varying the amount of oil supplied by one or other of the oil pumps 32, 36. Alternatively, oil may be supplied to all of the bearings by a single pump in which case the necessary adjustment of the position of each bearing will be obtained by manipulation of the throttle, by-pass or relief valves in the passages leading to the several clearance spaces. With this arrangement very fine adjustment of the position of each bearing can be obtained by manipulating the valves all of which may be located in accessible positions outside of the gear casing.

Where a pinion is supported by two bearings one of the bearings may be rigidly supported in the usual manner and the other bearing may be provided with supporting films as herein described. Alignment of the pinion may then be obtained by forcing more or less oil through the clearance space or spaces of the film supported bearing.

Where a pinion is supported by three bearings the middle bearing may be rigidly supported and the two end bearings may be supported on oil films. These two bearings may be supplied from separate oil pumps or from the same oil pump as hereinabove described.

Referring to Figure 3, a shaft journal 42 has its bearing 43 provided with clearance spaces at the sides so that oil films will be formed for supporting the bearing at its sides as well as above and below. Passages 44 permit of the supply of oil to the clearance spaces which passes therefrom through outlet passages 45. A projection or stop 46 is shown for preventing the bearing from rotating relatively to its support.

If it is desired to increase the cushioning action of the oil films, a plurality of parallel or co-axial clearance spaces may be provided to each of which oil is supplied. For example, as shown in Figure 4 the bearing 47, the supporting face 48 of which is plane instead of being cylindrical as shown in Figure 1, has two clearance spaces 49, 50 to which oil is supplied through a common passage 51 as shown by the arrows.

Instead of supplying the oil to the clearance spaces from a pump the well known pumping action of the journal may be employed for this purpose. Where an external pump is employed the oil may be used for lubricating the journal after passing through the clearance space or spaces.

The clearance spaces and consequently the oil films may assume different forms, Figure 4 as above mentioned illustrating a plane oil film, whereas Figure 1 illustrates a partially cylindrical oil film. Where a plane oil film is required the bearing itself will be rectangular in form as illustrated for example in Figures 5, 6 and 7.

Figure 5 shows a bearing 52 in which the clearance space 53 is of constant width and extends over substantially the whole supporting area, and in this case the pressure of the oil in the film will vary substantially as shown in the diagram, Figure 8, in which the ordinates denote the mean effective pressure of the oil film and it will be observed that it falls in a substantially regular manner from the point $a$ at which it enters the clearance space to the points $b$, $b$ at which it leaves such space.

In Figure 6 the clearance space 54 extends over a portion only of the supporting area and in such case with a given initial pressure of oil and a given supporting area the total supporting force will be greater than where the clearance spaces are uniform in width and extend over the whole supporting area but in the latter case a greater cushioning effect is secured. This will be evident from the corresponding pressure diagram Figure 9.

In the arrangement shown in Figure 7 the clearance space 55 is made to vary in width, that is to say the supporting film varies in thickness decreasing over a portion or the whole of the supporting area so that the full pressure of the oil will be exerted respectively over a portion or the whole of the supporting area even when the bearing is in its lowermost position. The variation in the oil pressure across the film may be as indicated by the diagram, Figure 10, but the shape of the pressure curve will obviously vary very considerably according to the manner in which the thickness of the oil film varies from the centre to the side of the bearing.

Where the clearance space is of uniform width throughout lugs or stops may be provided to prevent the bearing dropping to such an extent as would close up the clearance space. Such lugs or stops may take the form of narrow strips extending across the supporting area or they may be exterior to the clearance space and be of any convenient shape.

In the constructional forms described above it has been assumed for convenience that the forces act vertically downwards but it is evident that these forces may act vertically upwards or in any other direction, and t is desirable that their exact position should first be ascertained and the supporting oil films arranged in such a manner that the resulting forces in the films are directly opposed to the forces transmitted to the bearing from the shaft.

In the constructions described the bearings may be entirely independent of one another, or they may be connected with one another by a more or less rigid frame.

I claim as my invention:—

1. A floating bearing construction comprising a bushing or bearing member, a housing for the bushing or bearing member, said housing slidably engaging a portion of the bushing or bearing member and defining therewith a plurality of clearance spaces, a plurality of inlets in the housing for independently supplying fluid under pressure to the respective clearance spaces, and a plurality of outlets for fluid, whereby a bushing or bearing member cushioned on continuously-flowing fluid is provided.

2. A floating bearing construction comprising a bearing member normally subject to force in a given direction from a journal member, a support engaging the bearing member and defining with the latter a clearance space in the direction of the force, and means for continuously supplying fluid under pressure to the clearance space to constitute a fluid cushion which opposes the force.

3. A floating bearing construction comprising a bearing member for a journal member, a support having lateral guides for the bearing member and defining upper and lower clearance spaces with respect thereto, and means for continuously supplying fluid under pressure to the clearance spaces to constitute fluid cushions for the bearing member.

4. A floating bearing construction comprising a bearing member for a journal member, a support provided with lateral guide portions for the bearing member and defining upper and lower clearance spaces with respect thereto, means for continuously supplying fluid under pressure to the upper clearance space, and means for continuously supplying fluid at a greater pressure to the lower clearance space, whereby fluid cushions for the bearing member are provided.

5. A floating bearing construction comprising a bearing member or bushing having parallel plane faces, a support for the bearing member having guide portions which cooperate with said plane faces and which define, with the bushing or bearing member, clearance spaces between and at opposite ends of the plane faces and guide portions, inlets for supplying fluid under pressure to the clearance spaces, and drainage outlets for the clearance spaces, whereby cushions of continuously-flowing fluid are maintained in the clearance spaces.

6. The combination with a plurality of bearings for a rotatable element and means for adjusting the position of one of the bearings to adjust the position of the rotatable element in a given plane which comprises a support for the adjustable bearing having guides to limit the motion thereof to the plane of adjustment of the rotatable element and defining with the bearing a clearance space, means for supplying fluid under pressure to the clearance space, and means for varying the pressure of the supplied fluid, whereby the bushing or bearing member may be adjusted to different positions and be supported by a cushion constituted by continuously-flowing fluid.

7. The combination with a plurality of bearings for a rotatable element, of supporting means for the bearings which confines movement thereof to a single plane and defines clearance spaces with respect thereto at opposite sides, means for admitting fluid under pressure to the clearance spaces, outlet means for the fluid supplied to the clearance spaces, and means for varying the pressure of fluid admitted to the clearance spaces, whereby the bearings are supported by cushions of continuously-flowing fluid.

8. The combination with a plurality of bearings for a rotatable element whose axis may require adjustment in a given plane, of means for confining the bearings to motion in the given plane, means cooperating with the bearings and defining clearance spaces which are transverse to the plane of motion thereof, means for supplying fluid under pressure to each of the clearance spaces, outlet means for the clearance spaces, and means for bearing the pressure of fluid supplied to the clearance spaces, whereby the position of the rotatable element may be changed and the bearings supported upon cushions of continuously-flowing fluid.

In testimony whereof I have hereunto subscribed my name this thirty-first day of March, 1919.

KARL BAUMANN.